US00RE49916E

(19) United States
(12) Reissued Patent
Pinghua

(10) Patent Number: US RE49,916 E
(45) Date of Reissued Patent: Apr. 16, 2024

(54) THREE WHEEL ROLLATOR

(71) Applicant: Drive DeVilbiss Healthcare, Port Washington, NY (US)

(72) Inventor: Shi Pinghua, Jiangyin (CN)

(73) Assignee: Drive DeVilbiss Healthcare, Port Washington, NY (US)

(21) Appl. No.: 29/897,204

(22) Filed: Jul. 12, 2023

Related U.S. Patent Documents

Reissue of:
(64) Patent No.: Des. 943,464
Issued: Feb. 15, 2022
Appl. No.: 29/764,200
Filed: Dec. 29, 2020

(51) LOC (14) Cl. ..... 12-12
(52) U.S. Cl.
USPC ..... D12/130
(58) Field of Classification Search
USPC ..... D12/128, 129, 130, 131, 132, 133
(Continued)

(56) References Cited

U.S. PATENT DOCUMENTS 2,843,180 A * 7/1958 Schwartz ..... A61H 3/04 482/68
D281,771 S * 12/1985 Webb ..... D12/130
(Continued)

FOREIGN PATENT DOCUMENTS

FR 2737993 A1 2/1997
GN 305522550 S 12/2019
(Continued)

OTHER PUBLICATIONS

RedGumBrand Daily Living and Lifestyle Products; "Tri Walker" RG4402; Jan. 2020 User Manual.
(Continued)

*Primary Examiner* — Philip S Hyder
(74) *Attorney, Agent, or Firm* — Bradley J. Shelowitz

(57) CLAIM

The ornamental design for a three wheel rollator, as shown and described.

DESCRIPTION

[FIG. 1 is a front, perspective view of a three wheel rollator in accordance with the present design;]
[FIG. 2 is a front view thereof;]
[FIG. 3 is a rear view thereof;]
[FIG. 4 is a right side view thereof;]
[FIG. 5 is a left side view thereof;]
[FIG. 6 is a top view thereof; and,]
[FIG. 7 is a bottom view thereof.]
*FIG. 8 is a front, perspective view of a three wheel rollator in accordance with the present design;*
*FIG. 9 is a front view thereof;*
*FIG. 10 is a rear view thereof;*
*FIG. 11 is a right side view thereof;*
*FIG. 12 is a left side view thereof;*
*FIG. 13 is a top view thereof; and,*
*FIG. 14 is a bottom view thereof.*
The broken lines shown in the drawings illustrate portions of the three wheel rollator that form no part of the claimed design.

1 Claim, 14 Drawing Sheets

Figure 1:
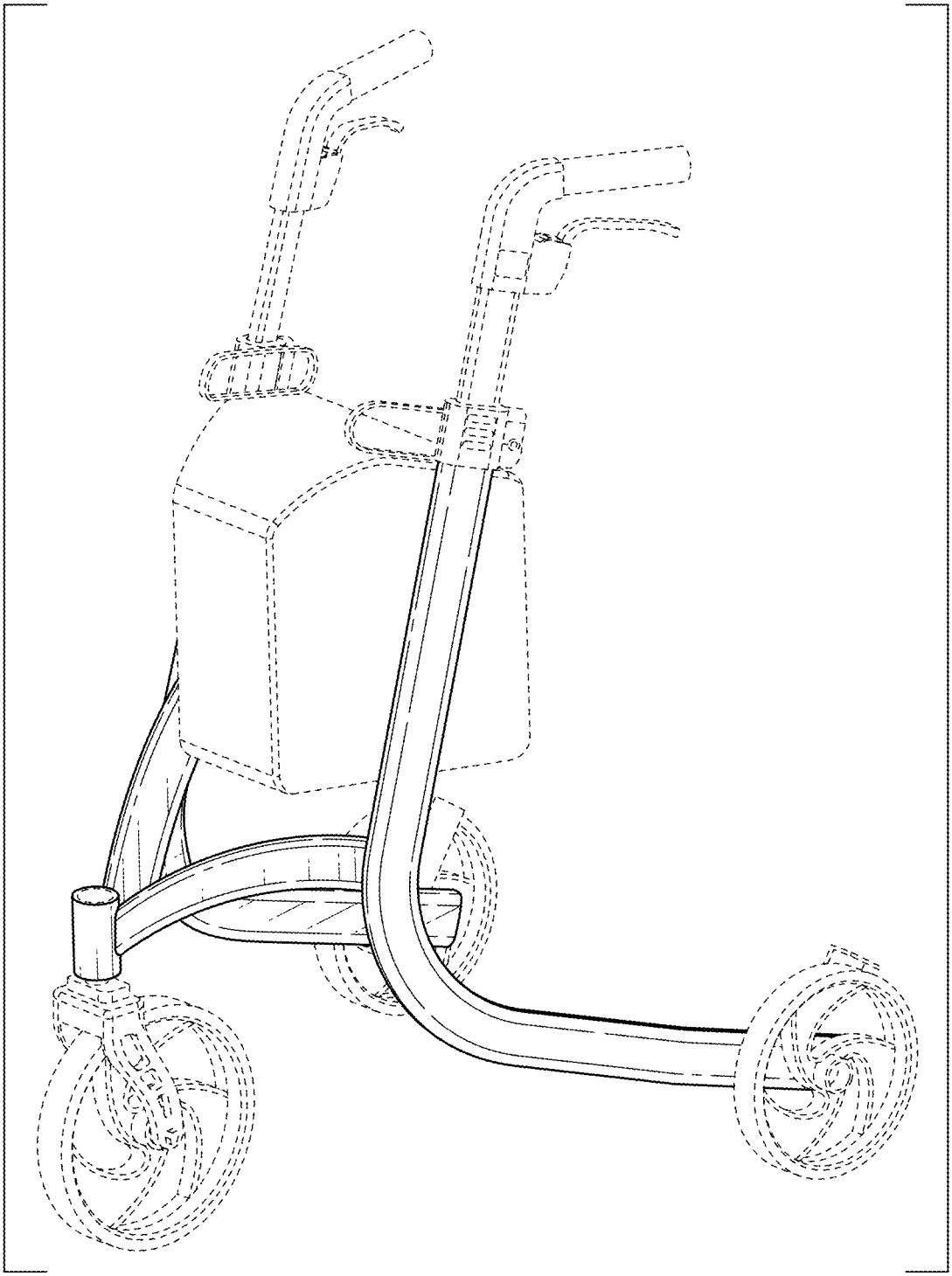
Figure 2:
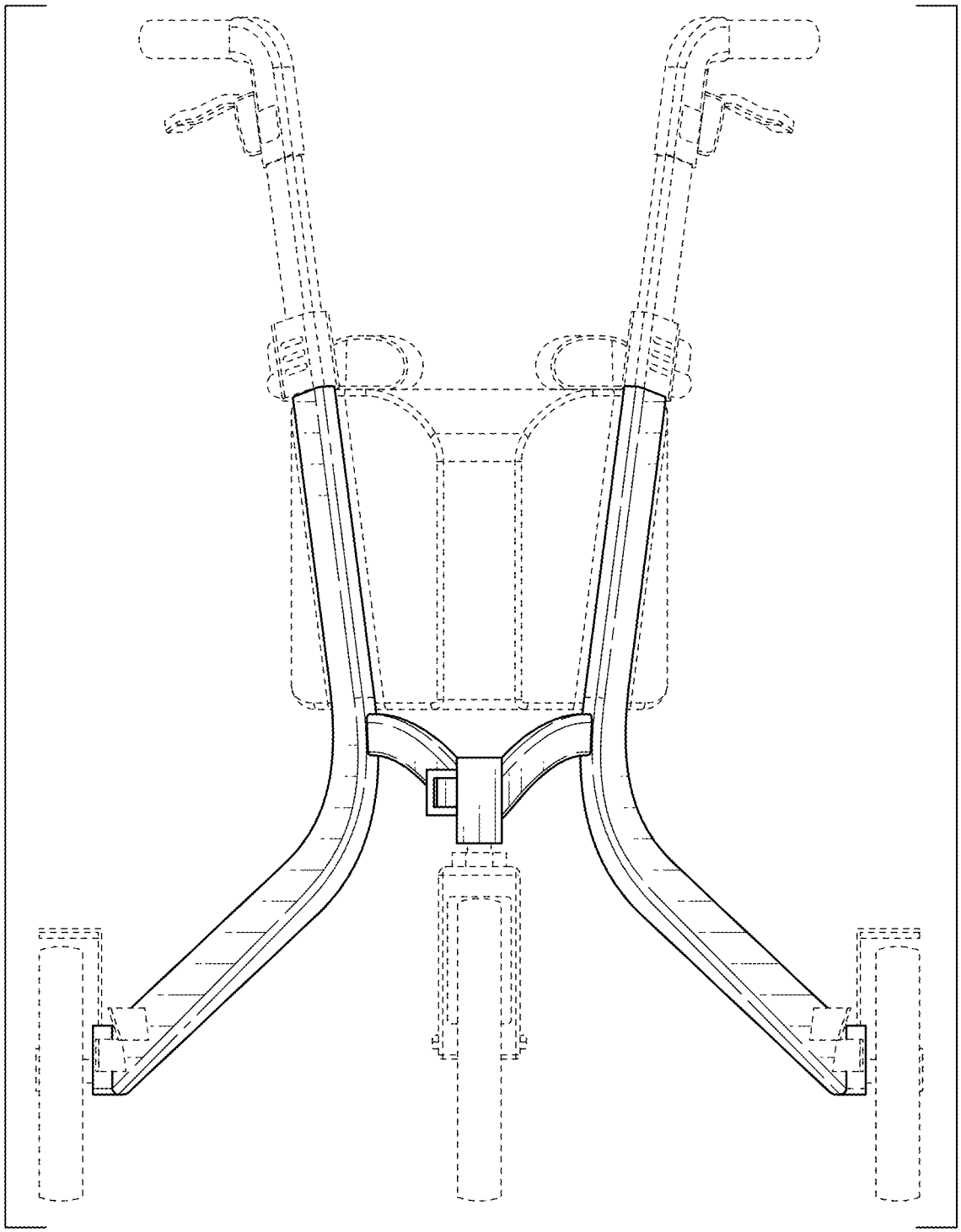
Figure 3:
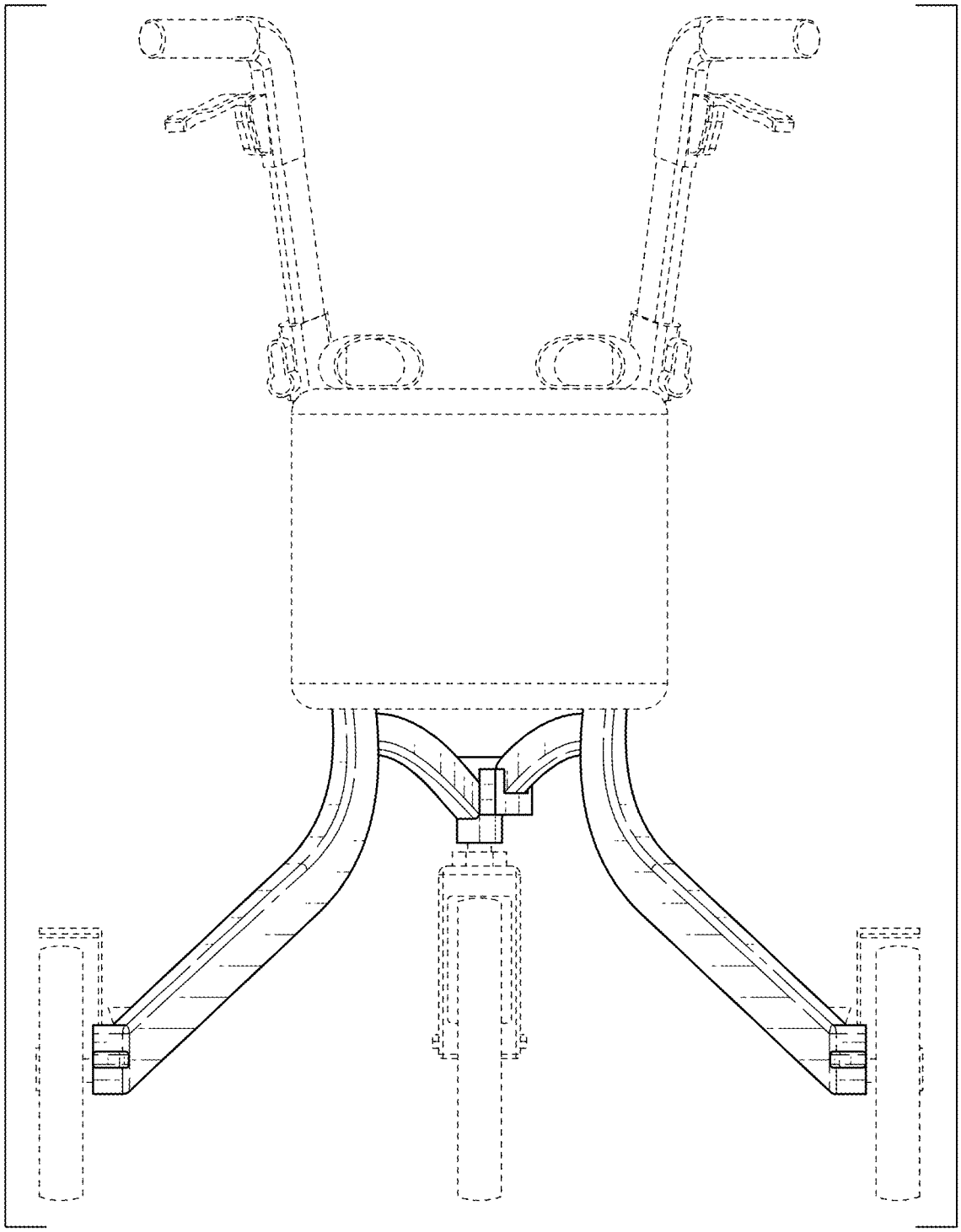
Figure 4:
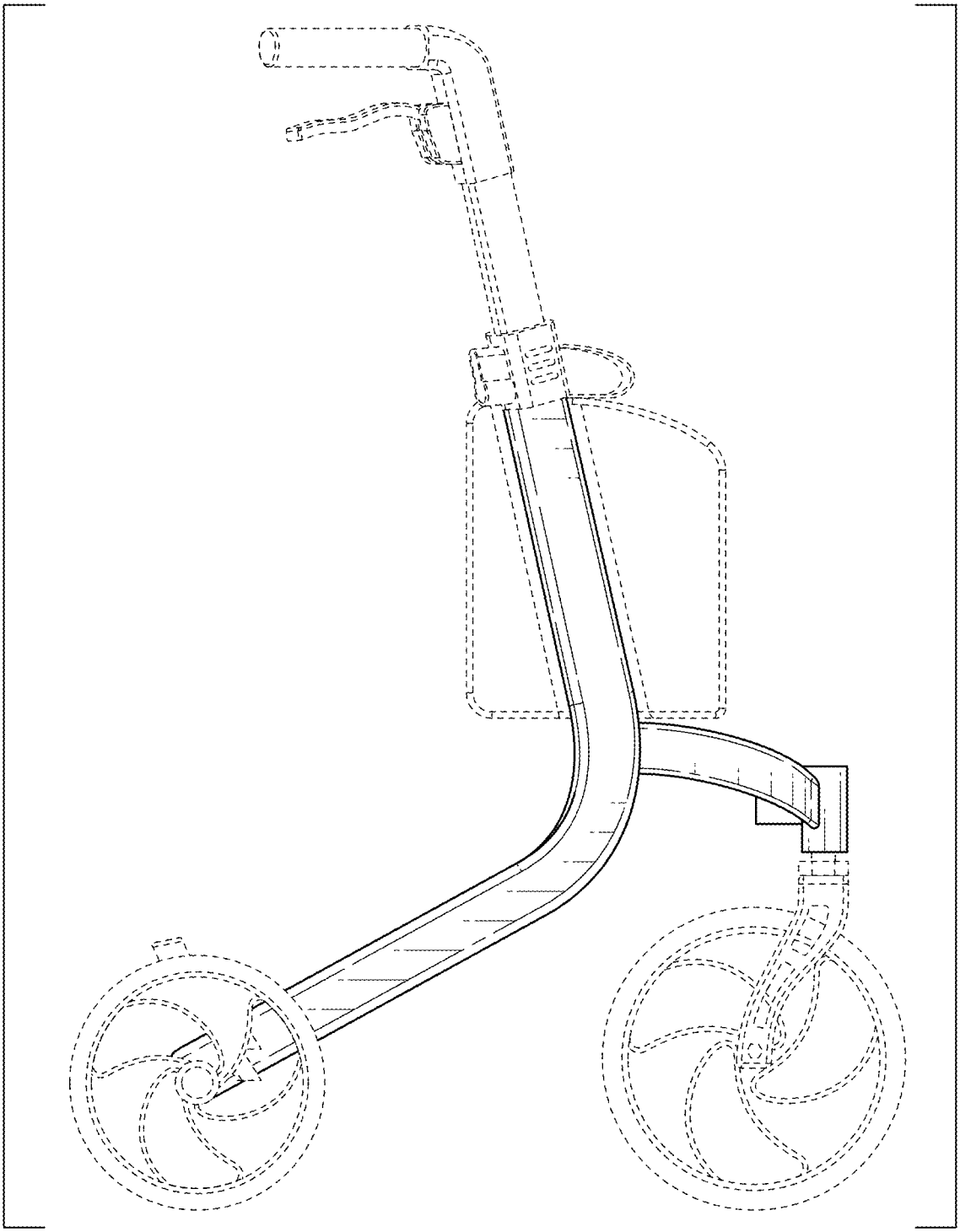
Figure 5:
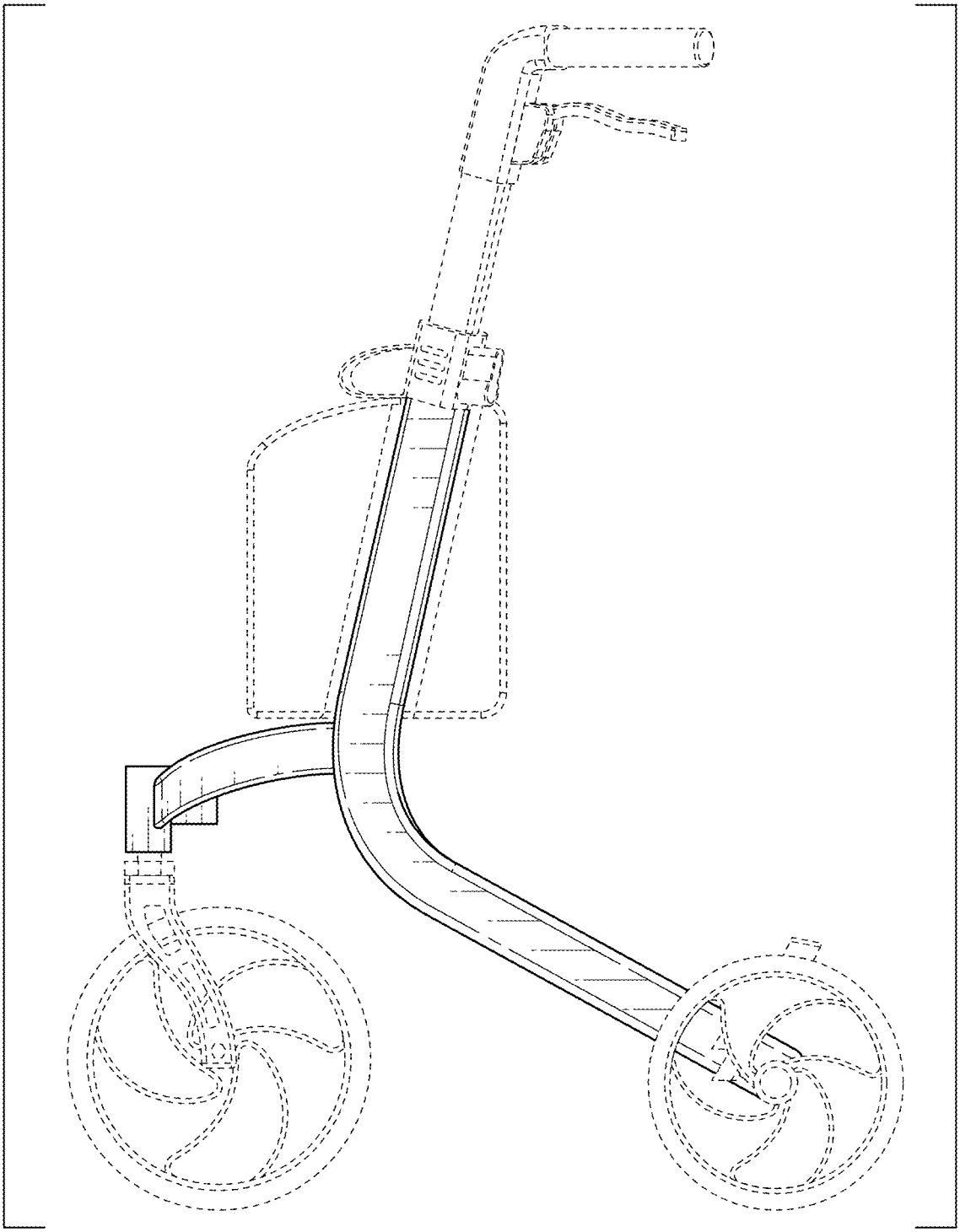
Figure 6:
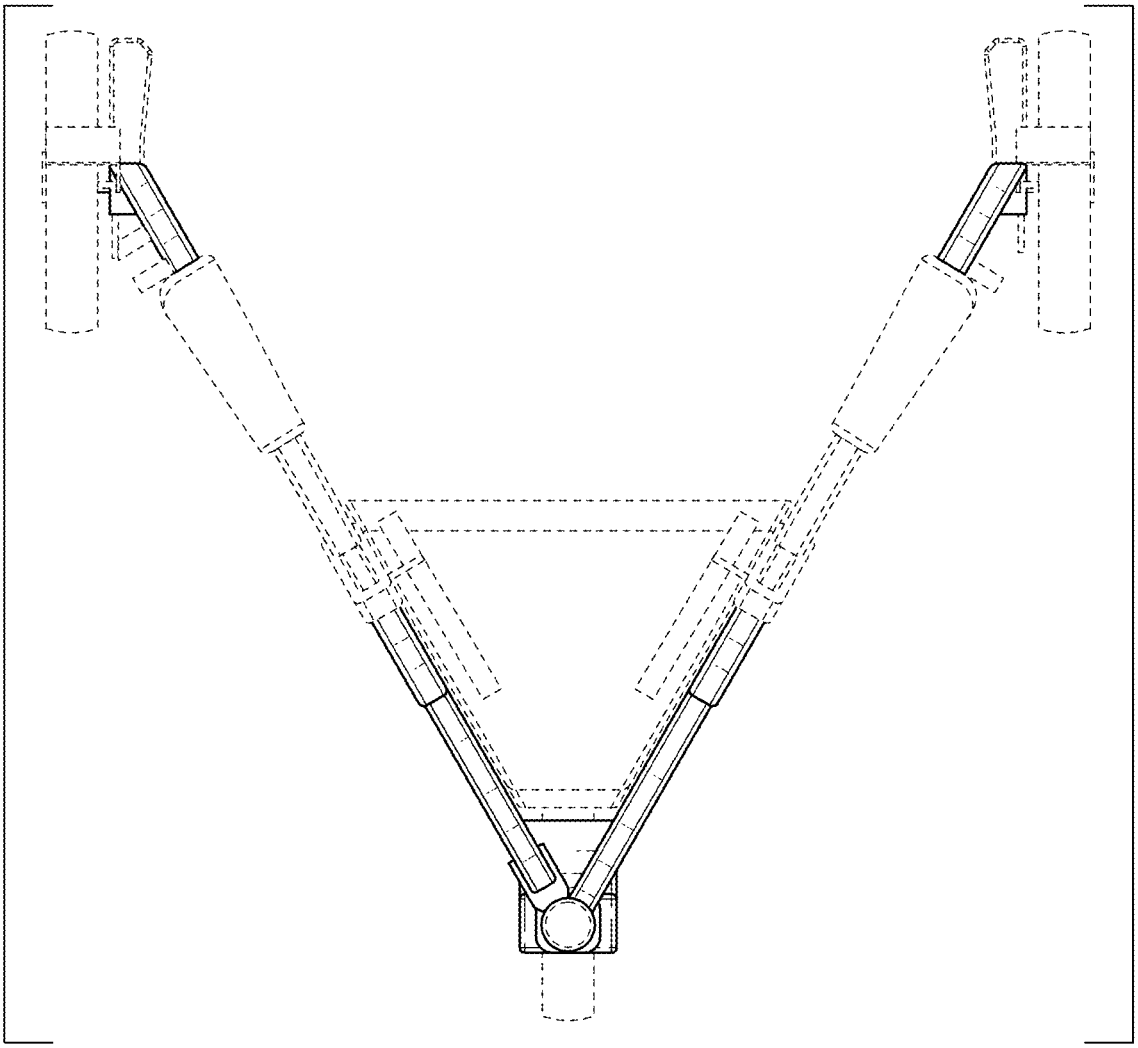
Figure 7:
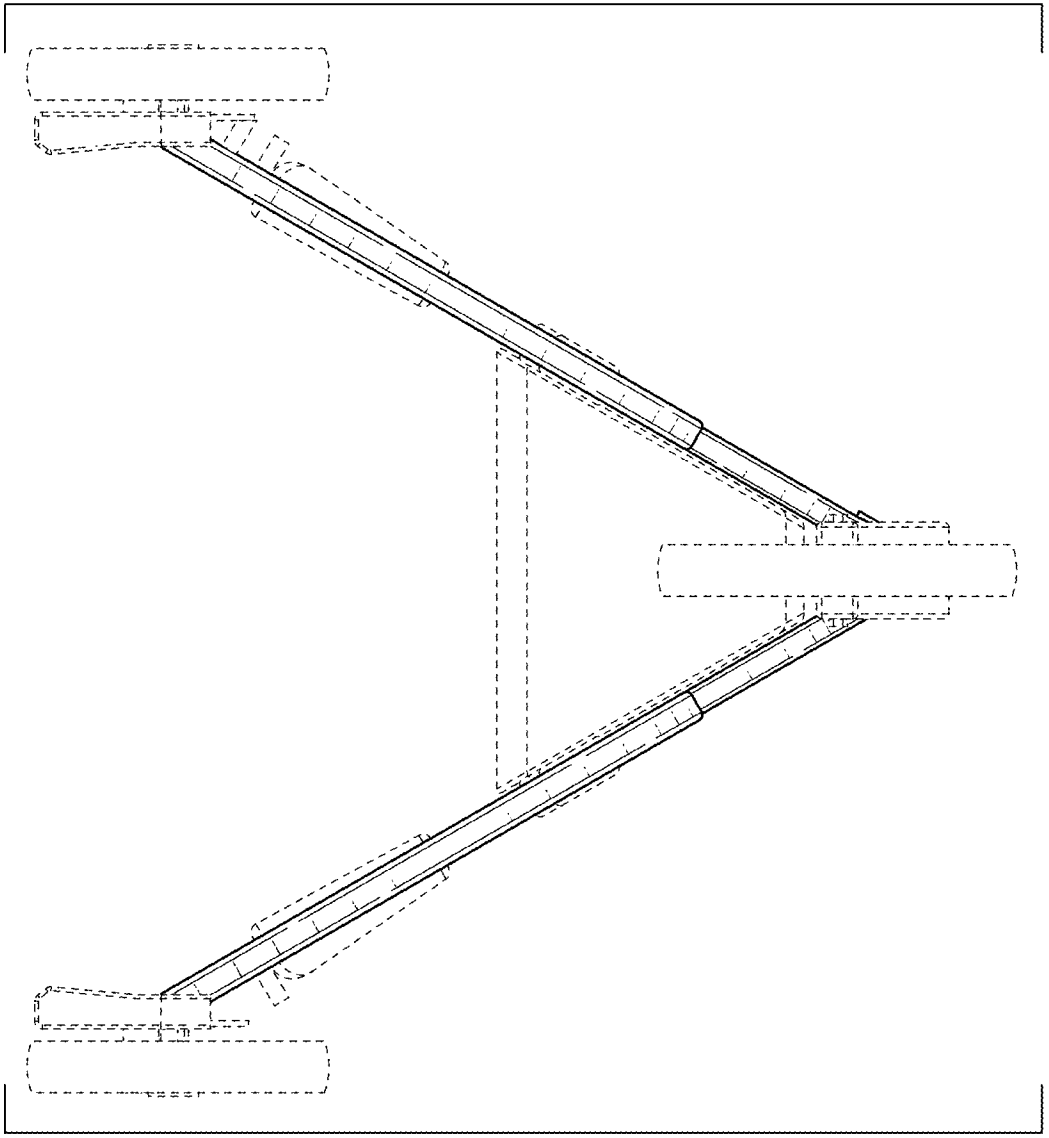

Matter enclosed in heavy brackets [ ] appears in the original patent but forms no part of this reissue; matter printed in italics indicates the additions made by reissue.

New

(58) Field of Classification Search
CPC ..... A61H 3/00; A61H 3/04; A61H 2003/001; A61H 2003/002; A61H 2003/003; A61H 2003/004; A61H 2003/005; A61H 2003/006; A61H 2003/007; A61H 2003/043; A61H 2003/046
See application file for complete search history.

(56) References Cited

U.S. PATENT DOCUMENTS

| | | | | |
|---|---|---|---|---|
| 5,020,560 | A | 6/1991 | Turbeville | |
| 6,070,603 | A * | 6/2000 | Politz | A61H 3/04 135/65 |
| 6,296,263 | B1 * | 10/2001 | Schultz | A61H 3/04 135/67 |
| 7,243,666 | B2 | 7/2007 | Carroll | |
| 7,708,120 | B2 * | 5/2010 | Einbinder | A61H 3/04 188/31 |
| 8,881,852 | B2 * | 11/2014 | Kim | A61H 3/04 180/65.1 |
| D819,503 | S * | 6/2018 | Huang | D12/130 |
| D836,499 | S * | 12/2018 | Delatorre | D12/130 |
| D837,697 | S * | 1/2019 | Luo | D12/130 |
| 10,470,966 | B1 * | 11/2019 | Smith Swerdlow | A61H 3/04 |
| 10,639,226 | B1 * | 5/2020 | Keyes | A61H 3/04 |
| D897,243 | S * | 9/2020 | Tsai | D12/130 |
| D941,193 | S * | 1/2022 | Cheng | D12/130 |
| 2009/0045021 | A1 * | 2/2009 | Einbinder | F16C 1/10 188/2 D |
| 2010/0140893 | A1 * | 6/2010 | Menefee | A61H 3/04 280/87.041 |
| 2012/0187661 | A1 * | 7/2012 | Kim | A61H 3/04 280/650 |
| 2013/0062848 | A1 * | 3/2013 | Huang | A61G 5/0891 280/87.021 |
| 2015/0173994 | A1 * | 6/2015 | Chen | A61H 3/00 280/639 |
| 2015/0351994 | A1 * | 12/2015 | Nicholson | A61H 3/04 280/639 |
| 2019/0029915 | A1 * | 1/2019 | Brockway | A61H 3/04 |
| 2019/0105220 | A1 * | 4/2019 | Pan | A61H 1/00 |
| 2019/0105221 | A1 * | 4/2019 | Pan | A61G 5/08 |
| 2019/0105222 | A1 * | 4/2019 | Fellingham | A61H 1/00 |
| 2020/0155408 | A1 * | 5/2020 | Fathi | A61H 1/00 |
| 2020/0261300 | A1 * | 8/2020 | Kousik | A61H 3/0244 |
| 2020/0315901 | A1 * | 10/2020 | Fellingham | A61H 3/04 |
| 2020/0352816 | A1 * | 11/2020 | Lu | A61H 3/04 |
| 2021/0361517 | A1 * | 11/2021 | Reuveni | A61H 3/04 |
| 2021/0393471 | A1 * | 12/2021 | Munton | A61H 3/04 |
| 2022/0211568 | A1 * | 7/2022 | AlGhazi | A61B 5/1117 |

FOREIGN PATENT DOCUMENTS

| | | |
|---|---|---|
| KR | 10-2013-0107495 | 10/2013 |
| WO | 2003/086264 A1 | 10/2003 |

OTHER PUBLICATIONS

Drive Medical Nitro 3, Published Mar. 5, 2021 [online], [retrieved on Dec. 4, 2021]. Retrieved from the Internet: https://www.amazon.com/Drive-Medical-Euro-Style-Rollator-Walker/dp/B08YG5JTMP (Year: 2021).*

* cited by examiner

FIG. 1 CANCELLED

FIG. 2 CANCELLED

FIG. 3 CANCELLED

FIG. 4 CANCELLED

FIG. 5 CANCELLED

FIG. 6 CANCELLED

FIG. 7 CANCELLED

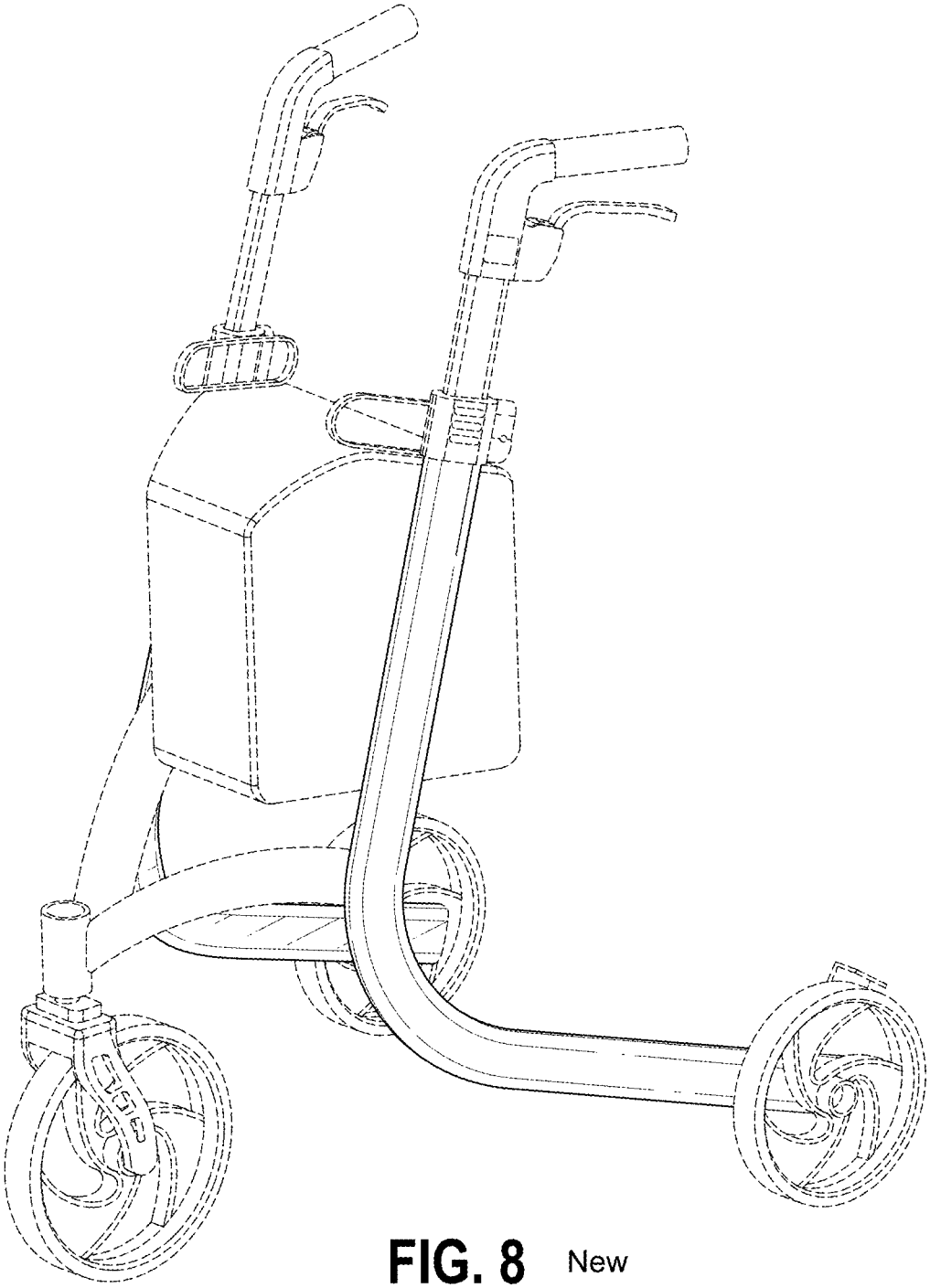
FIG. 8 New

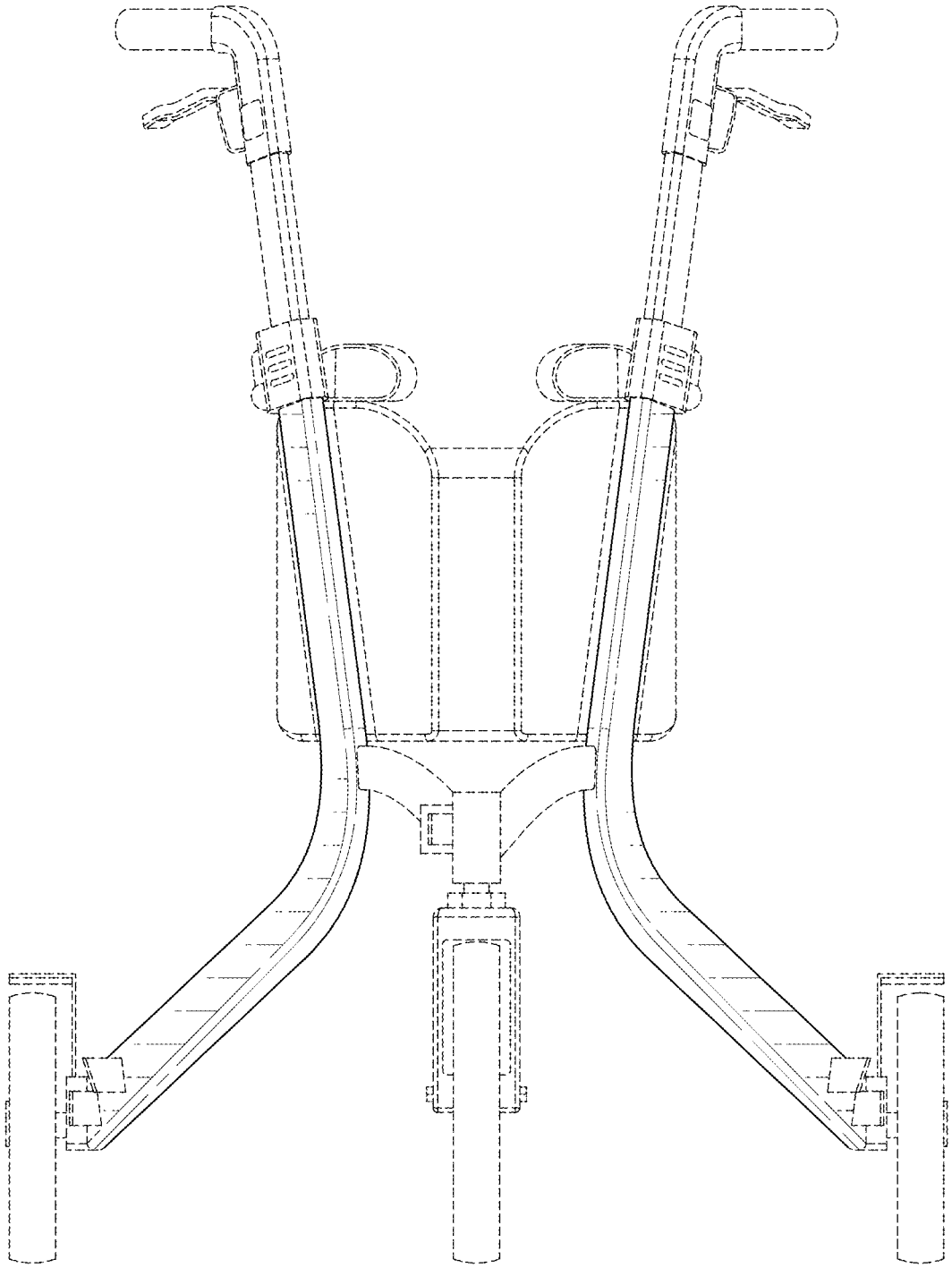
FIG. 9 New

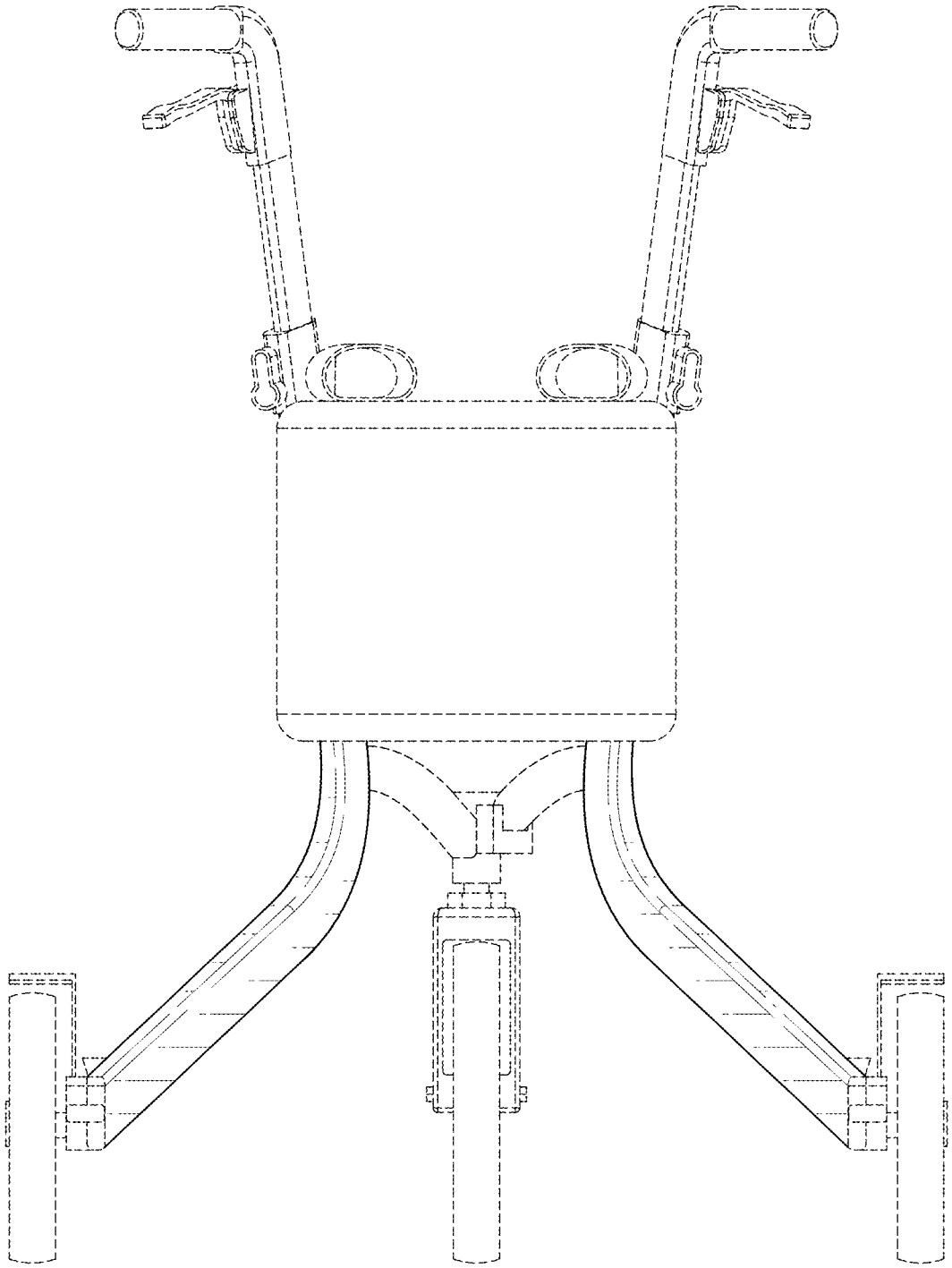
FIG. 10 New

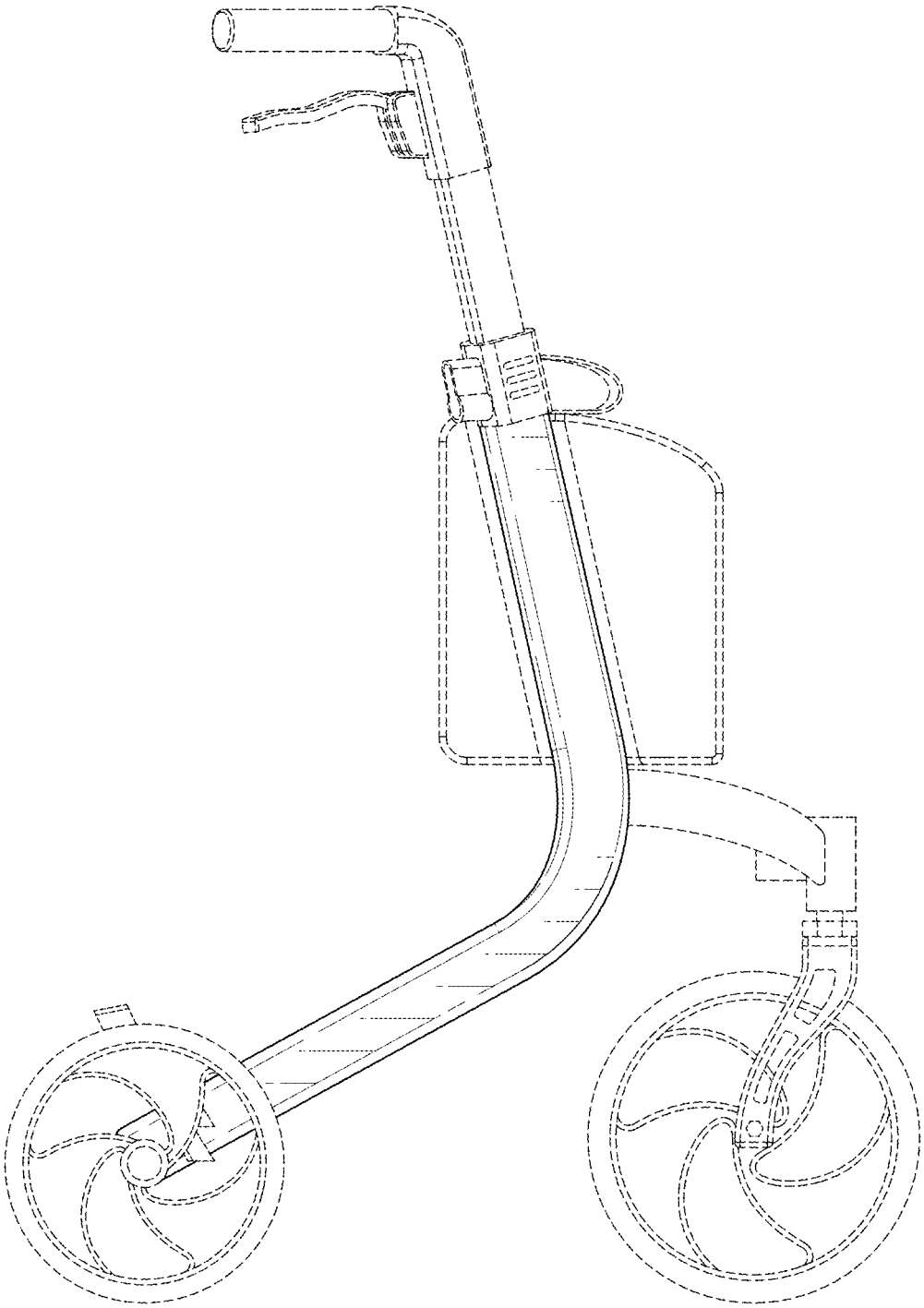
FIG. 11 New

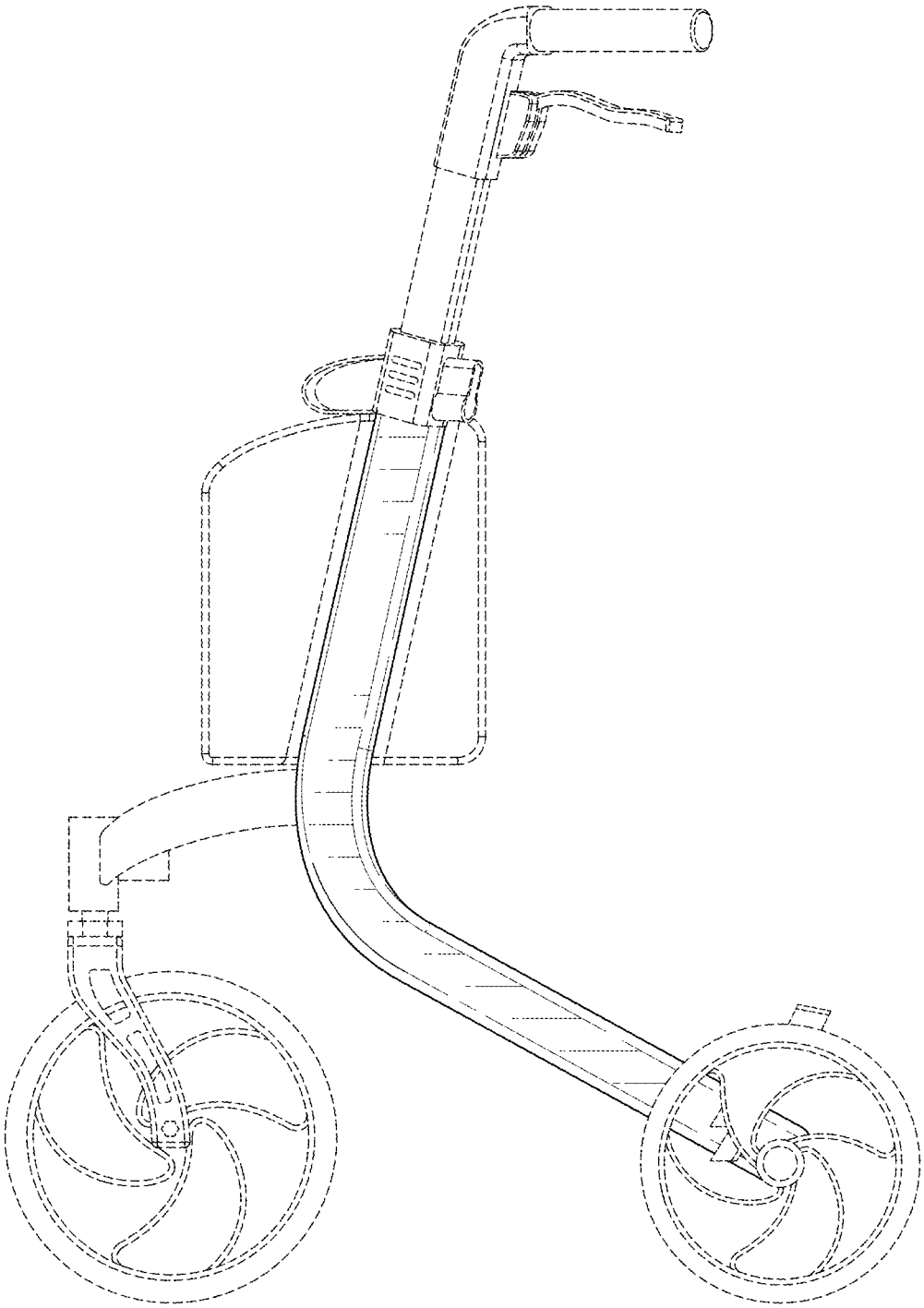
FIG. 12 New

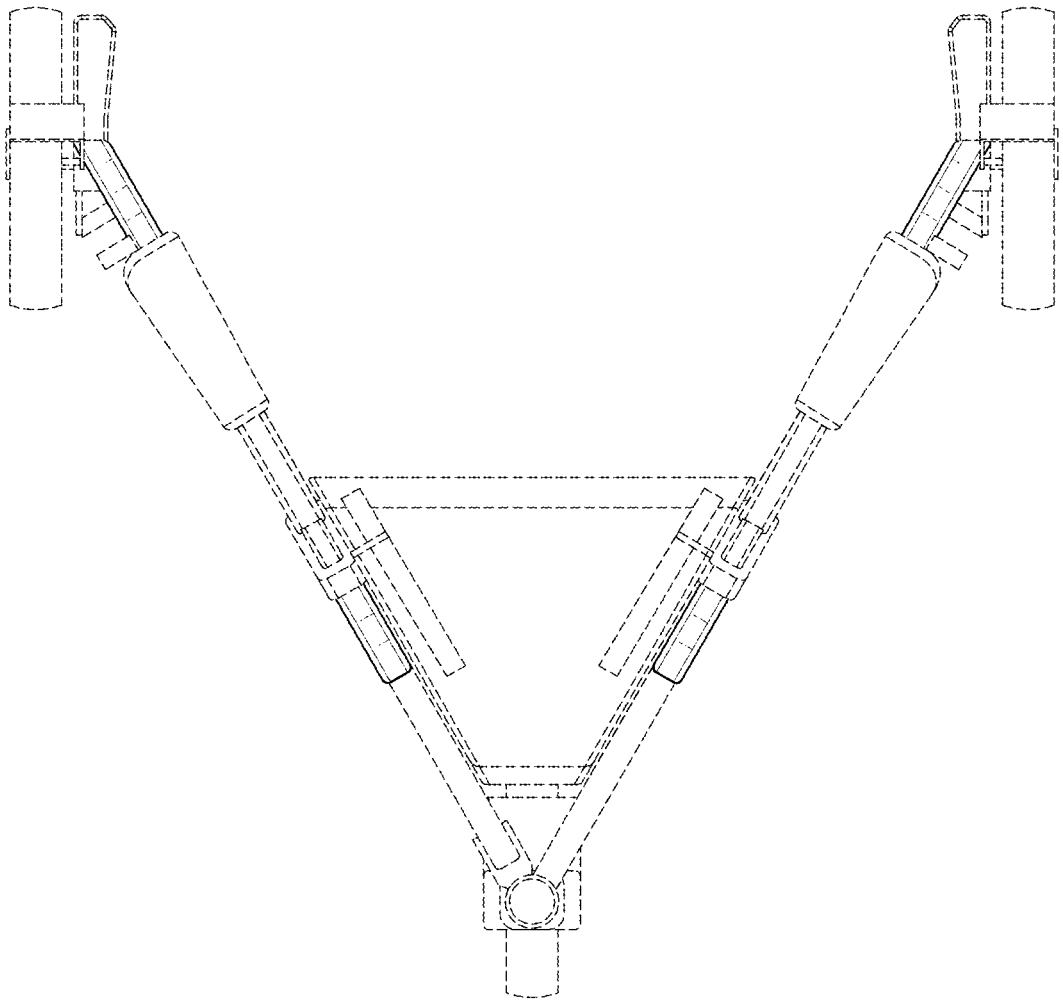
FIG. 13 New

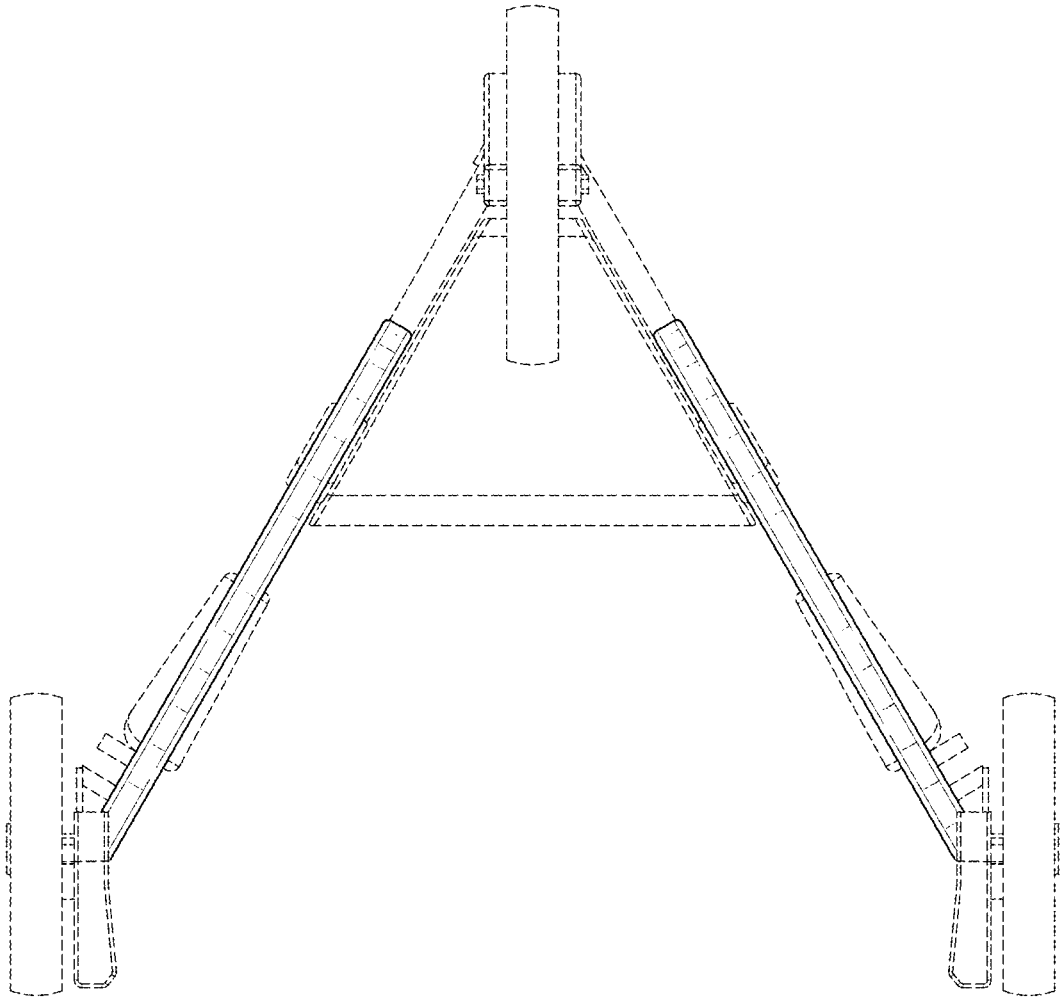
FIG. 14 New